United States Patent [19]
Stephenson et al.

[11] Patent Number: 5,455,617
[45] Date of Patent: Oct. 3, 1995

[54] THERMAL PRINTER SUPPLY HAVING NON-VOLATILE MEMORY

[75] Inventors: Stanley W. Stephenson, Spencerport; David L. Jeanmaire, Brockport, both of N.Y.

[73] Assignee: Eastman Kodak Company, Rochester, N.Y.

[21] Appl. No.: 241,977

[22] Filed: May 12, 1994

Related U.S. Application Data

[60] Continuation of Ser. No. 151,607, Nov. 12, 1993, which is a division of Ser. No. 858,731, Mar. 27, 1992, Pat. No. 5,266,968, and a continuation of Ser. No. 157,767, Nov. 24, 1993.

[51] Int. Cl.$^6$ .................................................. B41J 32/00
[52] U.S. Cl. ..................... 347/214; 400/207; 400/208; 400/208.1
[58] Field of Search ....................... 400/207, 208, 400/208.1, 191, 120; 346/76 PH

[56] References Cited

U.S. PATENT DOCUMENTS

| | | | |
|---|---|---|---|
| 4,616,236 | 10/1986 | Watanabe et al. | 346/76 PH |
| 4,710,781 | 12/1987 | Stephenson | 346/76 PH |
| 4,723,133 | 2/1988 | Walter | 346/134 |
| 4,786,917 | 11/1988 | Hauschild et al. | 346/76 PH |
| 4,797,018 | 1/1989 | Hofmann et al. | 400/249 |
| 4,893,951 | 1/1990 | Iwatani et al. | 400/225 |
| 5,035,325 | 7/1991 | Kitsuki | 206/459 |
| 5,079,565 | 1/1992 | Shimizu et al. | 346/76 PH |
| 5,138,344 | 8/1992 | Ujita | 346/140 R |
| 5,176,458 | 1/1993 | Wirth | 400/120 |
| 5,266,968 | 11/1993 | Stephenson | 346/76 PH |
| 5,278,577 | 1/1994 | Kitsuki | 400/208.1 |
| 5,318,370 | 6/1994 | Nehowig | 400/207 |

FOREIGN PATENT DOCUMENTS

| | | | |
|---|---|---|---|
| 0224980 | 1/1989 | Japan | B41J/17/32 |
| 310987 | 12/1989 | Japan | B41J/32/00 |
| 0292177 | 4/1992 | Japan | B41J/35/36 |
| 90/00974 | 2/1990 | WIPO | 400/207 |

OTHER PUBLICATIONS

Dallas Semiconductor "Memory Buttons", part series 199x, pp.92–93.

Primary Examiner—Benjamin R. Fuller
Assistant Examiner—Huan H. Tran
Attorney, Agent, or Firm—Milton S. Sales

[57] ABSTRACT

A non-volatile memory is mounted on a supply for a thermal printer and includes color correction and carrier defect data which are used by the printer to make prints.

23 Claims, 7 Drawing Sheets

FIG. 10

THERMAL PRINTER SUPPLY HAVING NON-VOLATILE MEMORY

CROSS-REFERENCE TO RELATED APPLICATION

This application is a continuation of (1) commonly assigned U.S. application Ser. No. 08/151,607 filed in the name of Stanley W. Stephenson on Nov. 12, 1993, titled NON-VOLATILE MEMORY THERMAL PRINTER CARTRIDGE, which is a Divisional Application of commonly-assigned U.S. patent application Ser. No. 07/858,731 filed in the name of Stanley W. Stephenson on Mar. 27, 1992, and issued as U.S. Pat. No. 5,266,968 on Nov. 30, 1993, and (2) commonly assigned U.S. application Ser. No. 08/157,767 filed in the names of Stanley W. Stephenson and David L. Jeanmaire on Nov. 24, 1993, titled NON-VOLATILE MEMORY THERMAL PRINTER MEDIA.

BACKGROUND OF THE INVENTION

The present invention relates to thermal printing of colored images which uses a carrier having a repeating series of spaced dye frames of different colored dyes.

In one type of thermal printing which prints colored images, a carrier contains a repeating series of spaced frames of different colored heat transferable dyes. Such frames are often yellow, magenta, and cyan (YMC), or cyan, magenta, yellow, and black (CMYB) dye frames. In such thermal printing apparatus, the carrier is disposed between a receiver and a print head formed of, for example, a plurality of individual heating elements. When a particular heating element is actuated, it produces heat and causes dye from the carrier to transfer to the receiver. The density or darkness of printed colored dye is a function of the energy delivered from the heating element to the carrier.

Thermal dye transfer printers offer the advantage of true "continuous tone" dye density transfer. This result is obtained by varying the energy applied from each heating element, yielding a variable dye density image pixel in the receiver.

The carrier is sometimes mounted in a cartridge which includes take-up and supply spools. While some thermal printers are configured to receive carrier contained in a cartridge, not all thermal printers are so configured.

A problem is that sometimes there are defective dye frames. If a single dye frame in a series is defective, then an unsatisfactory print will be produced by the thermal printer. In addition, the color dye densities in the dye frames may vary from cartridge to cartridge. If the print head is set up for a standard series of dye frames, this also can cause less than satisfactory prints to be produced.

SUMMARY OF THE INVENTION

It is an object of this invention to provide a simple and effective way of identifying actions to be taken with respect to designated dye frames, or providing characteristics of the carrier or designated dye frames. For example, a defective series of dye frames may be identified; as might variations in dye densities from carrier to carrier.

According to one embodiment of the present invention, an apparatus for use in a thermal printer includes a cartridge in which a carrier having a repeating series of dye frames of different dye colors is mounted such that the carrier can be advanced in the cartridge. Electronically-operable memory means is mounted on the cartridge for storing data corresponding to designated dye frames of the carrier whereby, upon connection of the cartridge to a thermal printer, the printer reads the data.

According to another embodiment of the present invention, for thermal printers not configured to receive cartridges, an apparatus includes a supply having a spool with a carrier spirally wound on the spool such that the carrier can be unwound from the spool. Electronically-operable memory means are mounted on the supply (preferably on the spool) for storing data corresponding to designated dye frames of the carrier whereby, upon connection of the cartridge to a thermal printer, the printer reads the data.

Preferably, the memory means is adapted to store data indicative of actions to be taken by a thermal printer to adjust the color of a printed image, thereby correcting the color in the image. According to an embodiment of the present invention, the memory means is adapted to store density correction data. According to a further embodiment of the present invention, the memory means is adapted to store data representing a location of a defective dye frame or series of dye frames of the carrier.

The invention and its objects and advantages will become more apparent from the following more detailed description of the preferred embodiments presented below, the accompanying drawings, and appended claims.

DETAILED DESCRIPTION OF THE PREFERRED EMBODIMENTS

Figure 1:
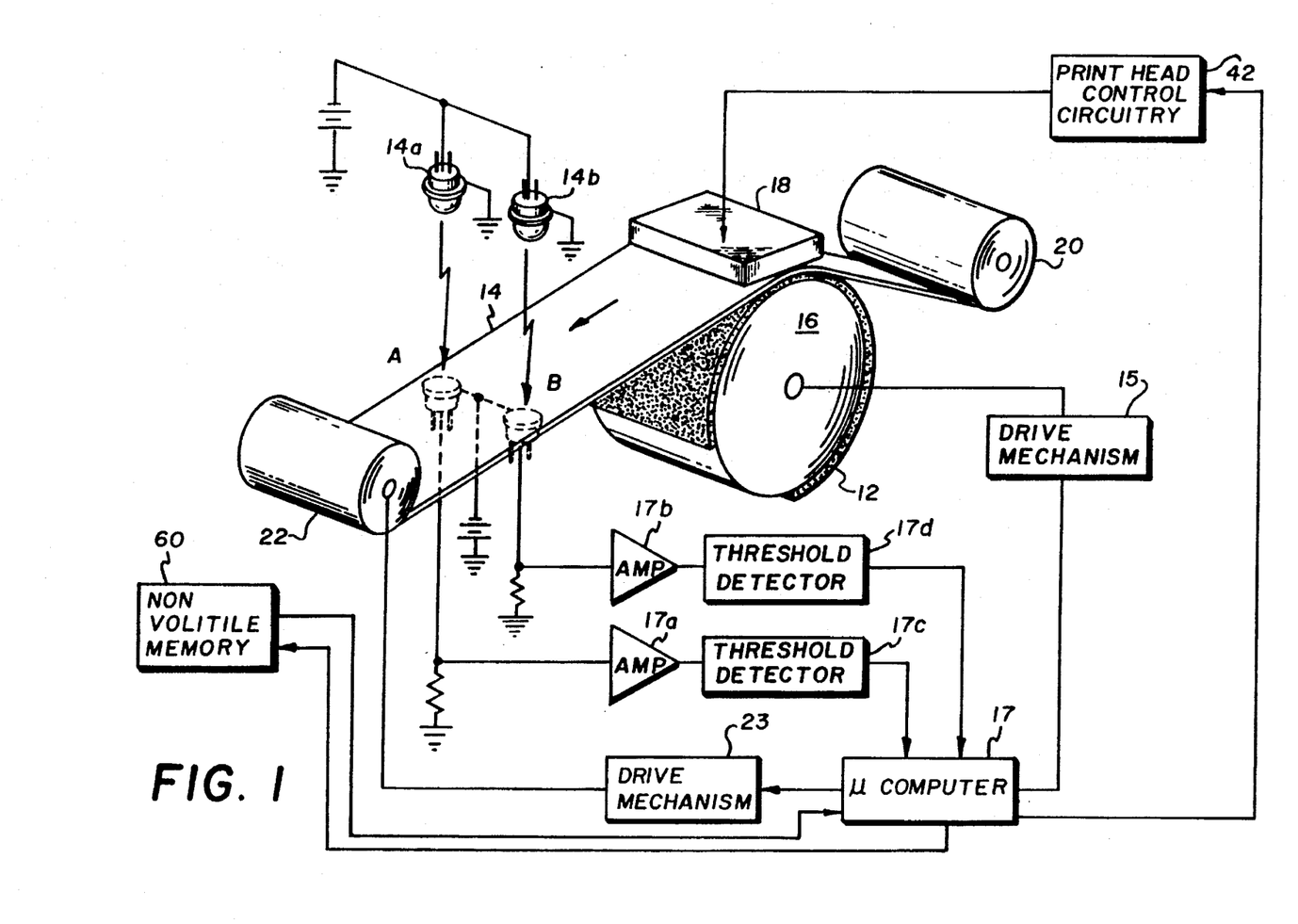
FIG. 1 is a schematic of a thermal printer which can be employed to make color images in a receiver in accordance with this invention.

Referring to FIG. 1, a receiver member 12 is in the form of a sheet and is secured to a rotatable drum 16 which is mechanically coupled to a drive mechanism 15. The drive mechanism 15 continuously advances the drum 16 and the receiver member 12 along a path past a stationary print head 18 during the cycle for actuating elements of the print head 18.

Figure 2:
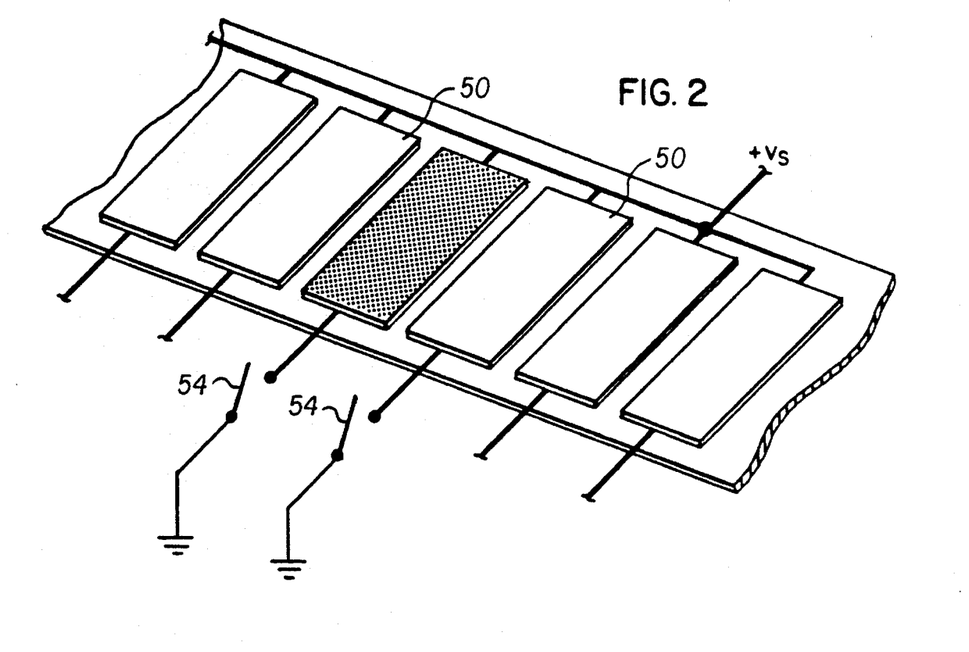
FIG. 2 is a perspective of several heating elements used in the print head of the printer of FIG. 1.

Turning to FIG. 2, we see further details of print head 18. The print head in this embodiment includes a plurality of heating resistors 50 which are pressed against a carrier 14 and force the carrier against the receiver member 12. As shown in FIG. 2, when a switching element 54 is closed, a heating resistor 50 is connected to a potential source $V_s$ and actuated. The amount of dye transferred is a function of the time switching element 54 is closed.

The carrier 14 is driven along a path from a supply spool 20 onto a take-up spool 22 by a drive mechanism 23 coupled to the take-up spool 22. The supply and take-up spools are shown in more detail in FIG. 4, which will be discussed later. The drive mechanisms 15 and 23 each include motors which respectively advance the carrier 14 and the receiver 12 in operative relation to the print head 18 as the various heating resistors 50 are selectively actuated to transfer dye.

Figure 3:
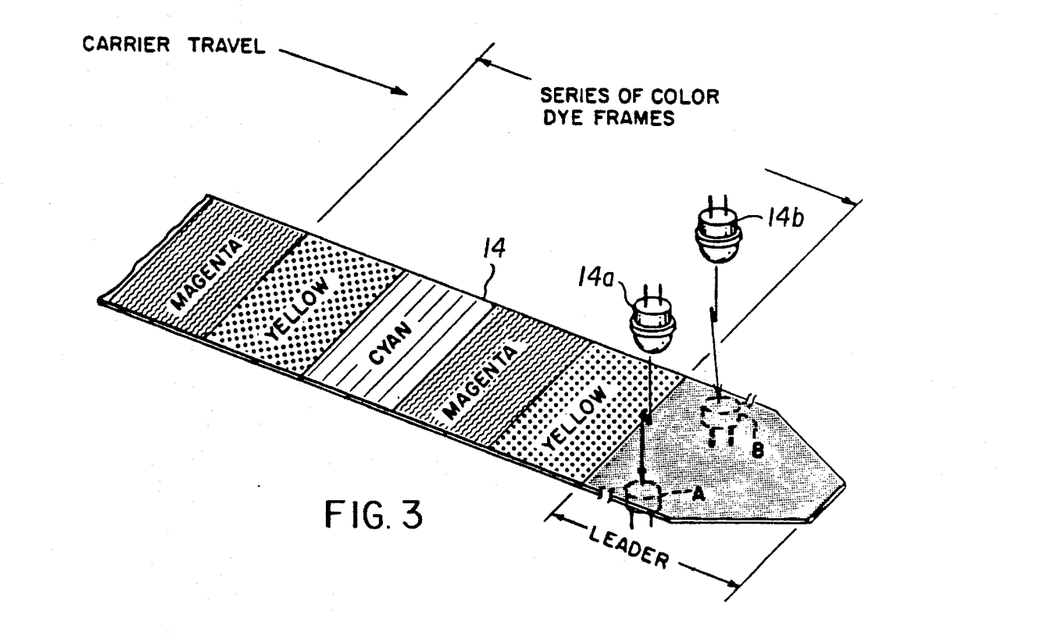
FIG. 3 shows a portion of a typical carrier.

The carrier 14 is, as noted above, formed with a repeating series of thermally transferable dye frames. As shown in FIG. 3, each series includes yellow, magenta and cyan dye frames. A single series is, of course, used to print one colored image in the receiver 12. As we will see, the present invention corrects for a defective series which would be when at least one dye frame has an incorrect dye color density.

In this disclosure, the term "dye" refers to a colored material which transfers from the carrier to a receiver in response to energy applied by individual elements of the print head 18. Although the print head 18 is shown as having heat resistor elements, those skilled in the art will understand that other sources of energy, such as diode laser array and individual lasers, can be effectively used in accordance with this invention. After a colored image is formed in a receiver, the receiver will be referred to as a print.

Referring now to FIGS. 1 and 3, we see that each dye frame extends across the width of the carrier 14. The carrier 14 comprises a leader portion followed by a repeating series of dye frames. The dye frames are contiguous and each series includes in sequence yellow, magenta, and cyan dye frames. As shown, there are two LEDs 14a and 14b which illuminate the carrier from above. LED 14a emits yellow light and LED 14b emits red light. Photodetectors A and B are disposed below the carrier and receive light which passes through the carrier. Photodetector A provides a signal to amplifier 17a and photodetector B provides a signal to amplifier 17b. Threshold detectors 17c and 17d are connected to the output of amplifiers 17a and 17b, respectively. If the signal produced by an amplifier is above a predetermined threshold level, then a logic 1 is provided by the threshold level detector to a μ computer (microcomputer) 17. If it is below a threshold level, then a logic 0 is provided to the microcomputer 17. The microcomputer 17 in response to these signals identifies the start of series and each individual color dye frame in such series. For a more complete discussion of this identification, reference is made to commonly assigned U.S. Pat. No. 4,710,781 to Stephenson, the disclosure of which is incorporated by reference herein. It will be understood to those skilled in the art that other types of well known apparatus can be used to identify the start of each series of colored dye frames. See U.S. Pat. No. 4,893,951.

Figure 4:
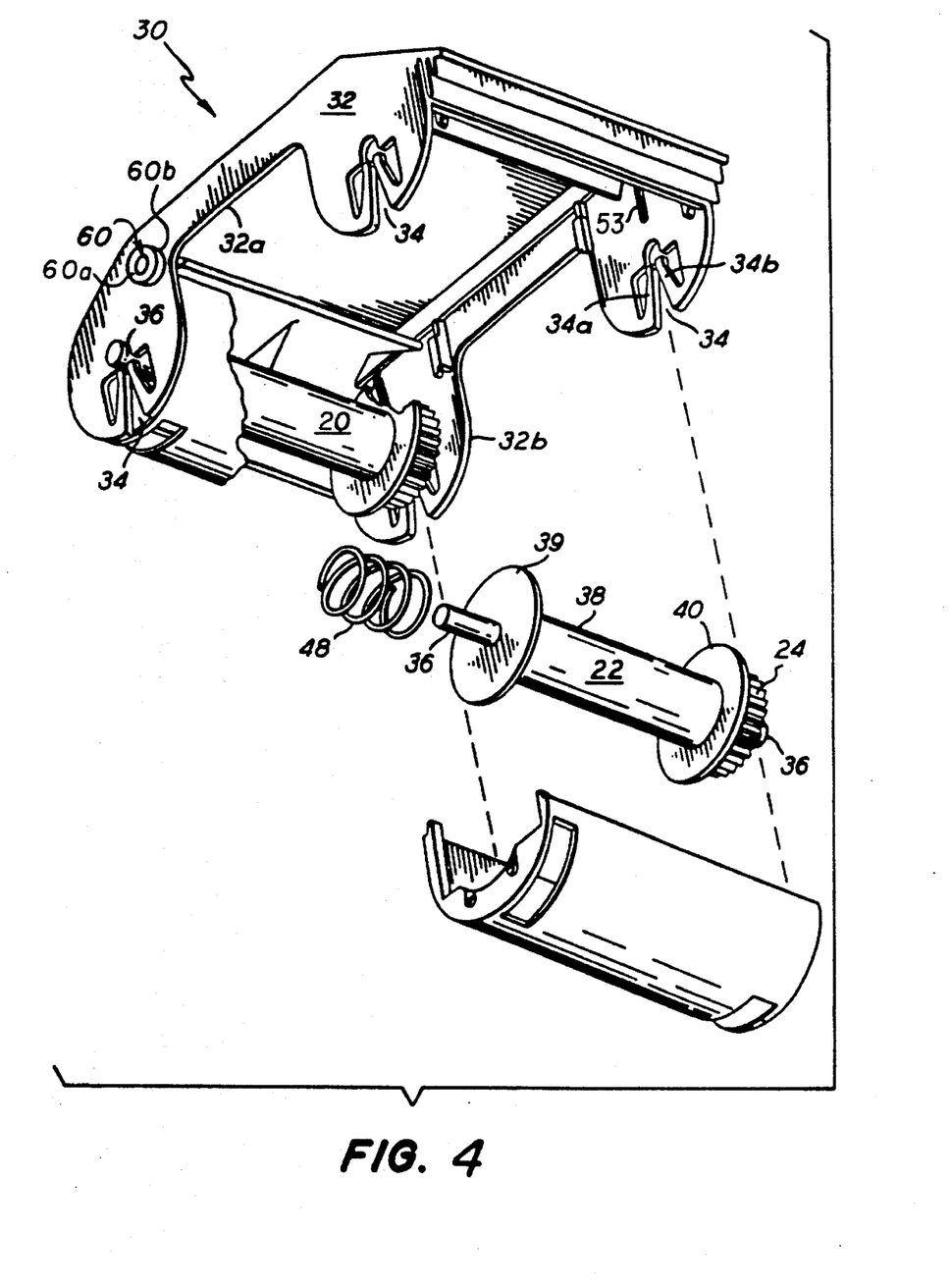
FIG. 4 is an exploded view of a cartridge containing a nonvolatile memory which can be mounted in the printer of FIG. 1.

FIG. 4, is an exploded view of a cartridge 30 for carrier 14, the carrier being of a web-type. The cartridge 30 includes a body or housing 32 which may be of the type formed of an injection molded plastic. The body 32 includes two pairs of identical, spaced-apart flanges 32a and 32b. Each of the flanges includes detents 34. Each detent is adapted to rotatably capture a spindle 36 of its corresponding spool. The detent 34 is composed of two integral spring members 34a and 34b which deflect apart when the spindle 36 is inserted. After insertion, the spring members 34a and 34b return to their free position and the spindle 36 is free to rotate, but is spatially retained within its corresponding flange.

Mounted on the cartridge 30 (preferably on body 32) is a non-volatile memory 60. This memory can be in the form of RAM with a permanent supply battery. One non-volatile memory that can be used is Dallas Semiconductor "Memory Button", part series 199x. The unit is a small battery-like can having two separable electrically conductive surfaces (60a and 60b). A two-point electrical communication format allows for the communication to the battery-backed memory element in the device. Two electrically separated contacts disposed within the printer provide a communication link between the printer and cartridge when the cartridge is inserted into the printer. Sets of other electrical components can be assembled into the cartridge to provide non-volatile data storage. Communication between the smart cartridge and printer can be accomplished using two or more wires or by the use of opto-electrical or radio frequency communication.

Both the supply spool 20 and take-up spool 22 are identical in construction and so only one need be described. Each spool includes a cylindrical portion 38 about which the carrier 14 is wound. Guard members 39 and 40 are respectively secured to the opposite ends of the central portion 38. Their purpose is to align the spooled carrier 14 between them. As shown, the spindles 36 extend outwardly from their respective guide members 39 and 40 and terminate in a free end. A gear member 24 is fixed to a spindle 36 and disposed between guide member 40 and the free end of a spindle 36. The gear 24 tooth design is such that a portion extends out beyond the face of the gear in a direction parallel to the axis of spindle 36. Two adjacent teeth form a groove along the face of the gear 24 nearest to the free end of the spindle 36. A coil spring 48 urges each spool so that the face grooves of the gear 24 engage ribs 53 formed on flange 32b to prevent the spool from rotating when the cartridge is removed from the printer. This is especially advantageous during handling as it prevents the carrier 14 from unwinding.

When the cartridge 30 is inserted into a thermal printer, such as disclosed in commonly assigned U.S. Pat. No. 4,723,133 to Walter, the non-volatile memory 60 is electrically connected to the microcomputer 17 as shown.

Figure 5:
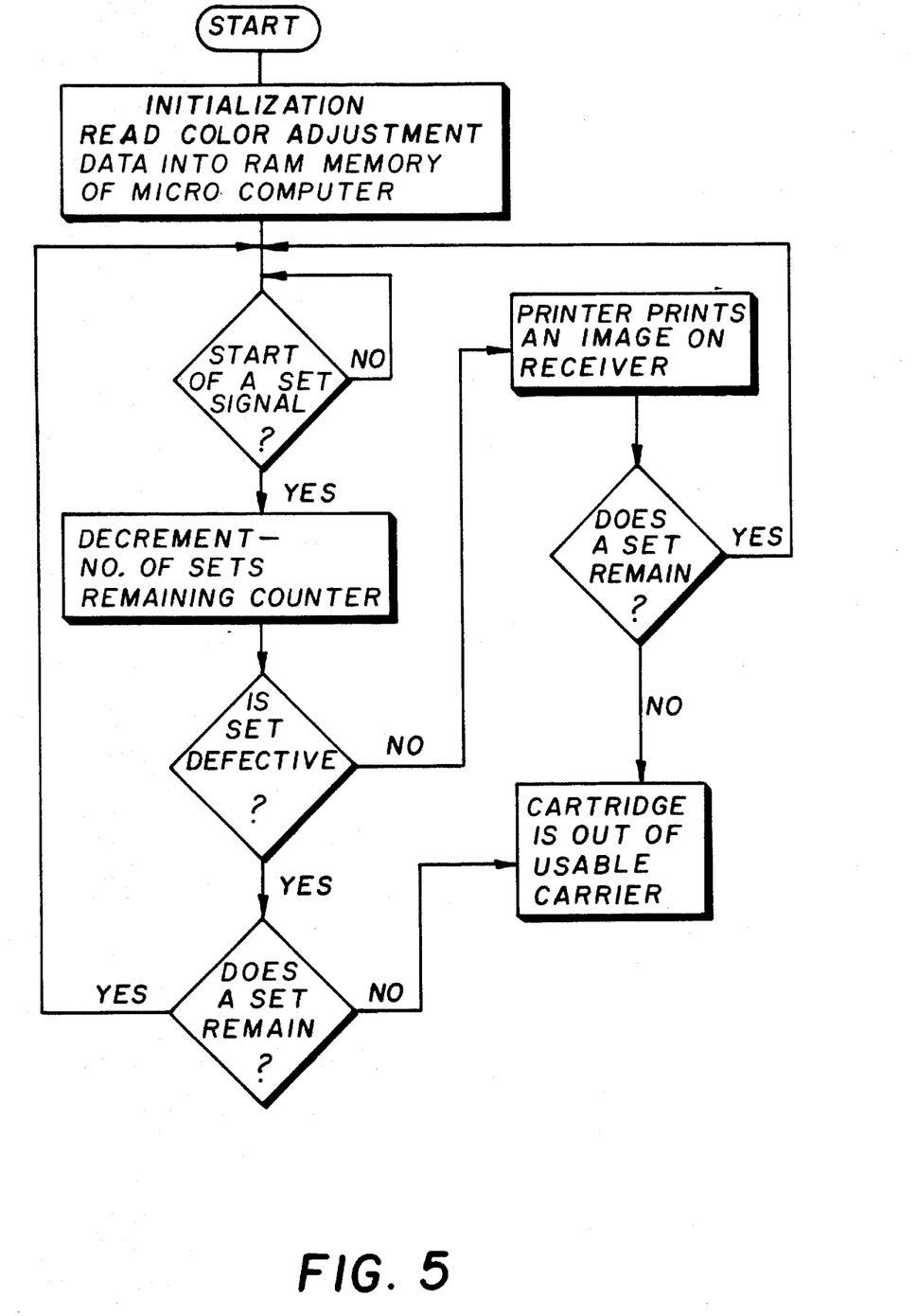
FIG. 5 is a flowchart for the correction for a defective series carrier by the printer of FIG. 1.

The operation of the microcomputer 17 for controlling the operation of the thermal printer will now be explained with reference to the flowchart of FIG. 5.

The non-volatile memory 60 can be preprogrammed with information, including characteristics of the carrier or designated dye frames. The memory 60 can be preprogrammed with a counter that indicates the number of sets remaining to be used. It will also contain color-adjustment data which will be transferred into RAM memory of microcomputer 17 to change the color and contrast information to modify the output color image based upon variations in the color dye density of the colored dye frames of the carrier from desired levels. For a more complete discussion of color signal processing which can be used in accordance with this invention, reference is made to commonly assigned U.S. Pat. No. 4,786,917 to Hauschild et al, the disclosure of which is incorporated by reference herein.

Other functions are also initialized, but they will not be discussed since they are not necessary to understand the invention. The drive mechanism 15 advances the carrier 14 until, in response to start of set signals provided by threshold detectors 17c and 17d, after the microcomputer 17 recognizes a start of series signal, it decrements the number of series remaining into the counter of memory 60. The carrier has been pre-examined and a defect location map is stored in the memory 60 which indicates the location or position of each series of frames in the carrier 14 containing a defective frame. If a series is defective, and the cartridge 30 is out of usable carrier (the number of sets remaining is "0"), the microcomputer 17 signals an indication on a display (not shown) that the cartridge 30 needs to be replaced. If a set remains, then the microcomputer 17 causes the drive mechanism 23 to advance the carrier and the above process is repeated. When a series is not defective, the printer would print an image in a receiver 12 as discussed above. During this time, the color correction data is used by the print head control circuitry 42 to vary the actuation time of heating resistors 50 of the print head 18 as is well known in the art. After the print is made, if a series remains, the above process is repeated. If a non-defective carrier series does not remain, then the display will be caused to indicate that the cartridge is out of usable carrier.

When the cartridge 30 is removed from the printer to make, for example, special colored prints, after it is replaced the carrier 14 will be advanced until the first fresh (non-used) and non-defective series is presented under the print head 18. Every time a cartridge is replaced, the above discussed initialization process takes place.

In another embodiment, wherein a printer is not configured to receive a cartridge, the present invention provides a supply having a spool with a carrier spirally wound on the spool. The carrier has a repeating series of dye frames of different dye colors. The carrier can be unwound from the spool. Electronically-operable memory means are mounted on the supply (preferably on the spool) for storing data corresponding to designated dye frames of the carrier, whereby upon connection of the cartridge to a thermal printer, the printer reads the data.

Figure 6:
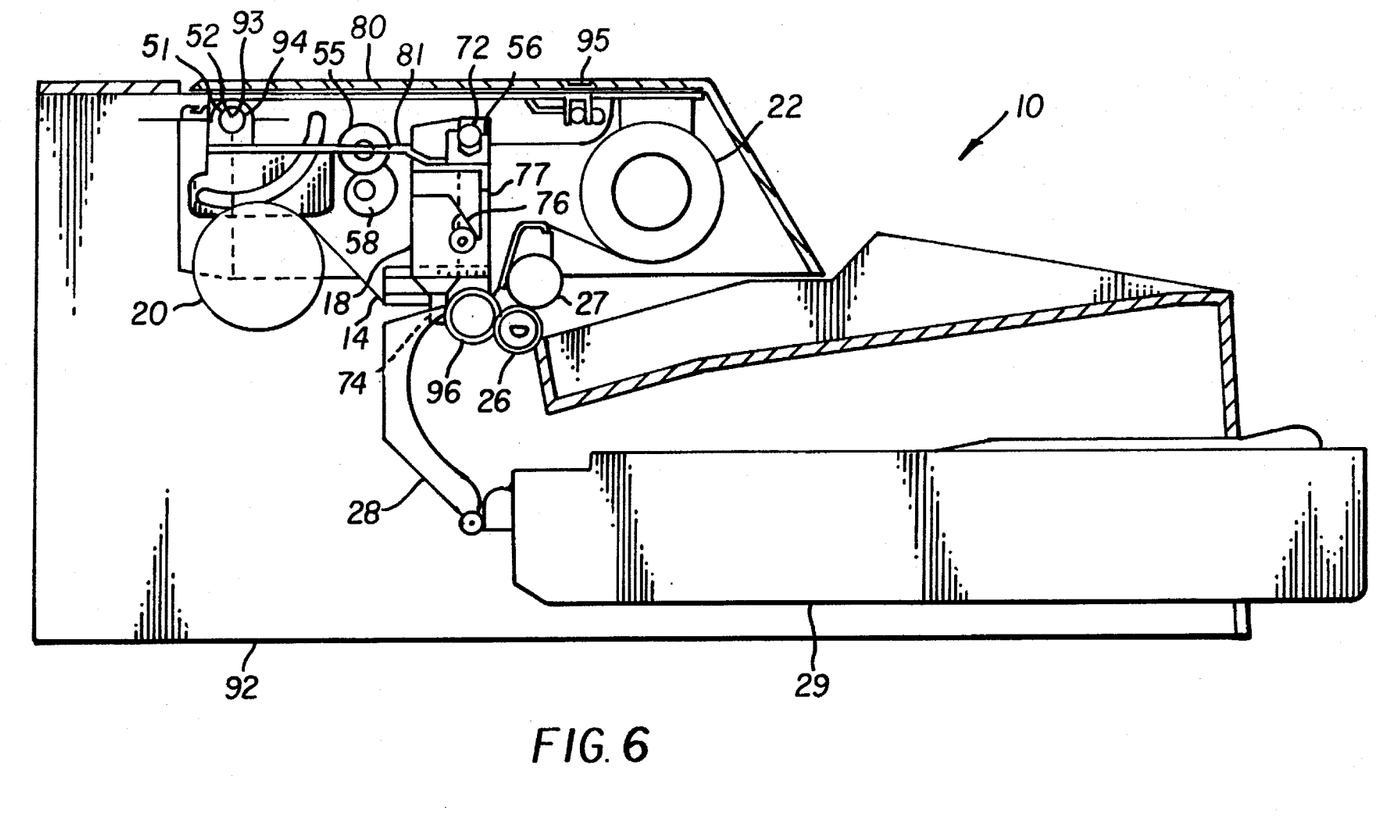
FIG. 6 is another schematic of a thermal printer which can be employed to make color images in a receiver in accordance with this invention.

FIG. 6 shows a thermal printer of the type not configured to receive a cartridge. According to this embodiment of the present invention, thermal printer 10 includes a cover mechanism 80 having several major components attached to it. These components include a head positioning arm 81, a print head 18, supply spool 20, and take-up spool 22. A main printer support structure 92 includes a roller platen assembly 96, a transport mechanism 26, and a receiver supply 29. Thermal printer 10 is shown as it operates, with cover mechanism 80 in a closed position.

The cover mechanism 80 is mounted to main printer support structure 92 through a cover mechanism mounting axis 93 which is coaxial with a cover mechanism mounting shaft 94. When a latch 95 is released, cover mechanism 80 can rotate to an open position. Head positioning arm 81 is mounted to cover mechanism 80 through a head positioning arm mounting axis 52 which is coaxial with a head positioning arm mounting shaft 51.

Normal thermal printer operations include loading carrier, printing information upon a receiver and ejecting the finished print. Each of these operations is fully described in co-assigned U.S. Pat. No. 5,176,458, which issued to H. G. Wirth on Jan. 5, 1993. The disclosure of that patent is hereby incorporated into this specification by reference, and therefore only a brief description will be herein given of the illustrated embodiment of the thermal printer.

Printer operation begins with the loading phase. The loading phase moves print head 18 to a loading position, advances receiver 12 to a printing location, and positions print head 18 in preparation for the printing operation.

In the loading dye phase of operation, print head 18 and head positioning arm 81 begin in their ejecting positions, which are at the highest point of travel of head positioning arm 81 range of motion. A first cam 58 is driven to a loading position which is between the ejecting and the printing positions. A first cam follower 55 attached to head positioning arm 81 maintains contact with first cam 58, and head positioning arm 81 rotates about its mounting axis 52 to a loading position.

A pin receiving recess 56 located on head positioning arm 81 constrains a first pin 72 of print head 18 to movement in one axis, which in the case of this embodiment is the vertical axis. In the loading position, first pin 72 contacts a side of pin receiving recess 56 and an adjustment screw, not shown, for setting the point at which head positioning arm 81 contacts first pin 72 as arm 81 moves from the print position to other positions, and for modifying the point in the head positioning arm's motion at which a second cam follower 76 contacts a second cam surface 77.

As head positioning arm 81 moves to a loading position, print head 18 moves to its loading position. Second cam follower 76 allows print head 18 to tilt toward roller platen assembly 96, until a guide 74 contacts platen assembly 96. When print head 18 reaches its loading position, print head 18 is spaced a distance away from platen assembly 96.

Receiver 12 moves forward into a guide 28, where it follows a curved path toward a gap between print head 18 and platen assembly 96. As the receiver 12 moves into this gap, it contacts carrier 14 and is guided toward transport mechanism 26 and associated pinch roller 27. While this embodiment describes receiver 12 in sheet form, receiver 12 supplied in roll form could also be utilized.

Once receiver 12 is firmly held by transport mechanism 26, print head 18 moves toward platen assembly 96, pressing carrier 14 and receiver 12 against platen assembly 96 to form a sandwich for thermal printing.

When the loading phase of operation is completed, printer 10 enters the printing phase of operation, during which print head 18 presses carrier 14 and receiver 12 into platen assembly 96, and prints information on receiver 12. When the printing phase of operation is completed, printer 10 enters the ejecting phase of operation, during which the print head 18 is retracted from the platen assembly 96 and the finished print is ejected from the printer.

When print head 18 is in the ejecting position, transport mechanism 26 which captures receiver 12 between it and pinch roller 27, drives the completed print out of thermal printer 10. When the ejecting phase of the printer operation is finished, the printer is ready to begin another printing operation.

Figure 7:
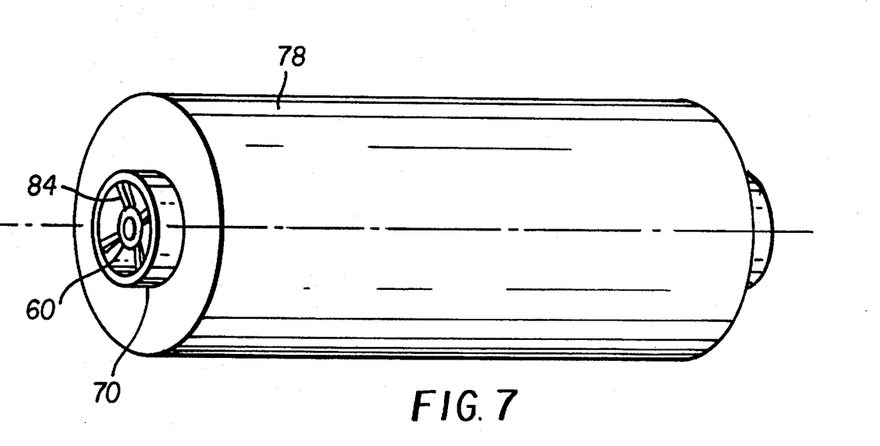
FIG. 7 is a perspective view of a roll of medium.

FIG. 7 illustrates a roll 78 of thermal medium. The medium can be carrier as illustrated in FIGS. 2 and 3 or it could be receiver, even though the illustrated embodiment provides receiver in sheet form. Illustrated roll 78 can be a supply roll or a take-up roll.

Roll 78 is spirally wound on a spool 70 having a longitudinal axis. Preferably, the spool is a hollow cylindrical extrusion with open ends and an interior, but other constructions will readily occur to workers in the art. Spool 70 is preferably supported in a thermal printer by a pair of printer spindles received in the open ends of the spool.

Mounted on spool 70 is a non-volatile memory device 60. This memory device can be in the form of RAM with a permanent supply battery. One non-volatile memory device that can be used is Dallas Semiconductor "Memory Button", part series 199x, as discussed above. A two point electrical communication format allows for electrical communication to the battery-backed memory element in the canister. Two electrically separated contacts disposed within the printer provide a communication link between the printer and the memory element when roll 78 is inserted into the printer. Sets of other electrical components can be assembled into the spool to provide non-volatile data storage. Communication between the spool and printer can be accomplished using two or more wires or by the use of opto-electrical or radio frequency communication.

Figure 8:
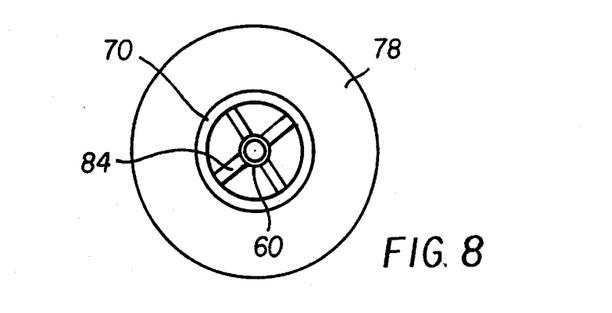
FIG. 8 is an end view of the roll of medium shown in FIG. 7.
Figure 9:
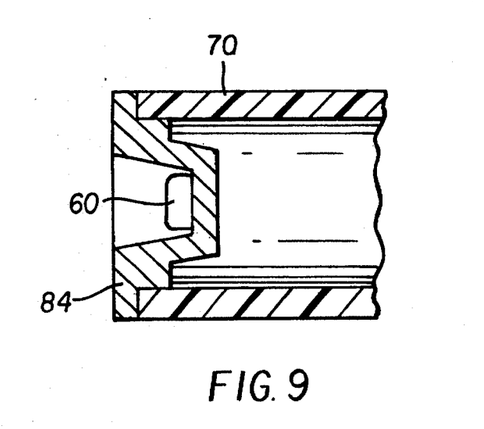
FIG. 9 is a sectional view of the roll of medium shown in FIGS. 7 and 8.

As is best seen from FIGS. 7–9, memory device 60 is preferably mounted on a support 84 which has been slid into the hollow interior of spool 70 with a pressure fit. The memory device is preferably mounted along the longitudinal axis of spool 70. Other ways to mount the memory device to the carrier will readily occur to those skilled in the art.

When the supply is inserted into the printer, the non-volatile memory is electrically connected to a microcomputer, such as microcomputer 17. The operation of the microcomputer for controlling the operation of the printer will now be explained with reference to the flowchart of FIG. 10.

Figure 10:
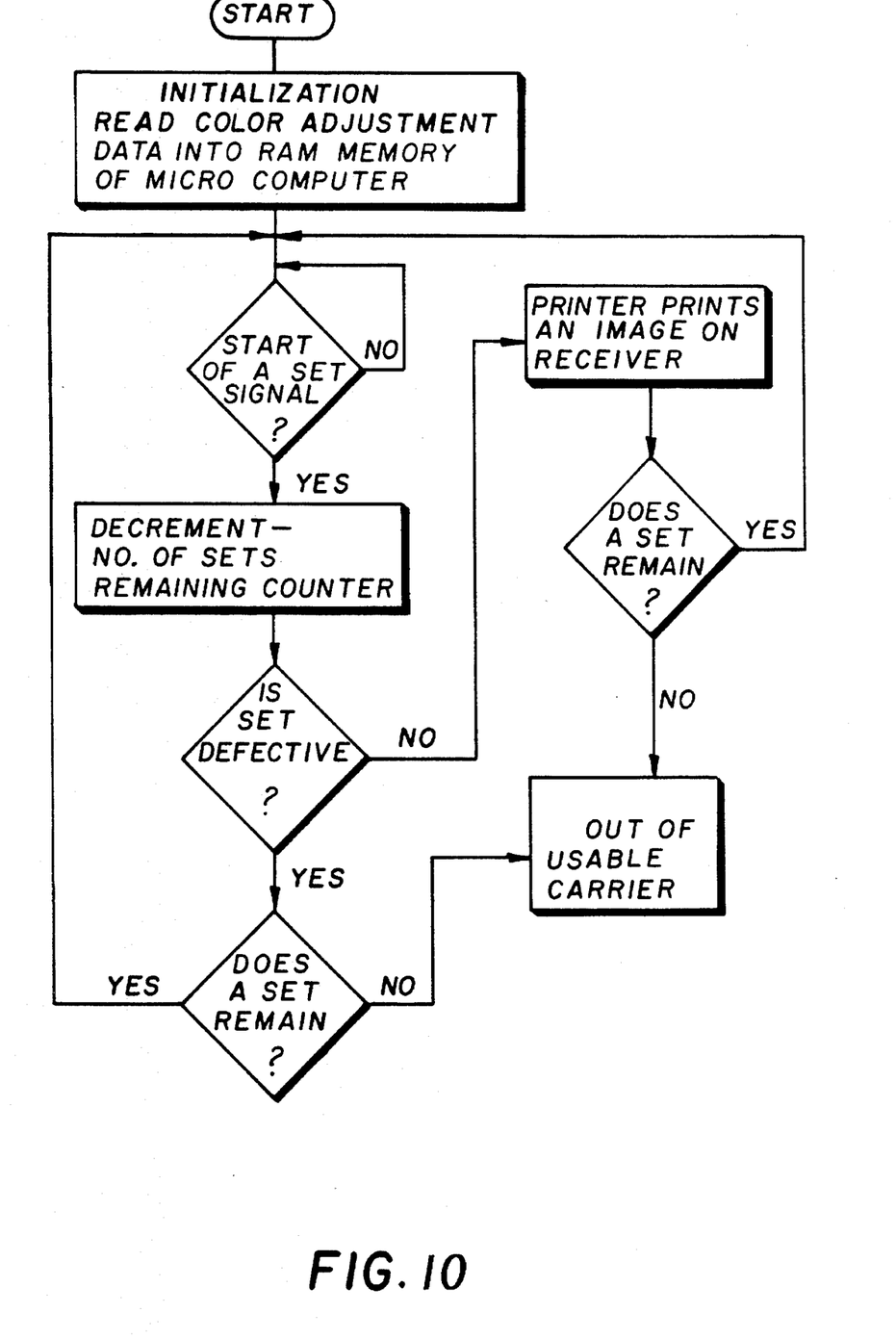
FIG. 10 is a flowchart for the correction for a defective series carrier by the printer of FIG. 6.

Non-volatile memory 60 can be preprogrammed with information, including data representing a location of a defective dye frame of the carrier, characteristics of the carrier or designated dye frames. The memory 60 can be preprogrammed with a counter that indicates the number of sets remaining to be used. It will also contain color-adjustment data which will be transferred into RAM memory of the printer microcomputer to change the color and contrast information to modify the output color image based upon variations in the color dye density of the colored dye frames of the dye from desired levels. For a more complete discussion of color signal processing which can be used in accordance with this invention, reference is made to commonly assigned U.S. Pat. No. 4,786,917 to Hauschild et al, the disclosure of which is incorporated by reference herein. Other functions are also initialized, but they will not be discussed since they are not necessary to understand the invention.

As carrier 14 is advanced, the printer microcomputer decrements the number of series remaining counter in memory 60 each time a start-of-series signal is provided by threshold detectors 17a and 17b of FIG. 3. The carrier has been pre-examined, and a defect location map is stored in memory 60 which indicates the location or position of each series of frames in carrier 14 containing a defective frame. If a series is defective, and the roll 78 is out of usable carrier (the number of sets remaining is "zero"), the printer's microcomputer causes an operator alert to be displayed that the roll 78 needs to be replaced. If a set remains, then microcomputer causes the drive mechanism to advance the carrier and the above process is repeated. When a series is not defective, the printer would print an image in a receiver as discussed above. During this time, the color correction data is used by the print head control circuitry to vary the actuation time of resistors 50 of print head 18 as is well known in the art. After the print is made, if a series remains, the above process is repeated. If a non-defective series does not remain, then the display will be caused to indicate that the cartridge is out of usable dye donor medium.

When carrier 14 is replaced in the printer after having been removed, such as to make special colored prints, the carrier will be advanced until the first fresh (non-used) and non-defective series is presented under the print head. Every time a roll is replaced, the above-discussed initialization process takes place.

The invention has been described in detail with particular reference to a certain preferred embodiment thereof, but it will be understood that variations and modifications can be effected within the spirit and scope of the invention.

What is claimed is:

1. For use with a thermal printer, apparatus comprising:
   a cartridge;
   a carrier in the cartridge, said carrier having a repeating series of dye frames of different dye colors;
   means for mounting the carrier in the cartridge such that the carrier can be advanced in the cartridge; and
   electronically-operable memory means mounted on the cartridge for storing data corresponding to designated dye frames of the carrier, whereby upon connection of the cartridge to a thermal printer, the printer reads the data.

2. Apparatus as set forth in claim 1, wherein the memory means is adapted to store data indicative of corrective action to be taken by a thermal printer to correct the color of a printed image.

3. Apparatus as set forth in claim 2, wherein the memory means is adapted to store color density correcting data.

4. Apparatus as set forth in claim 1, wherein the memory means is adapted to store data representing a location of a defective dye frame of the carrier.

5. Apparatus as set forth in claim 1, wherein the memory means is adapted to store data representing a location of a defective series of dye frames of the carrier.

6. Apparatus as set forth in claim 1, wherein the memory means is non-volatile memory.

7. For use with a thermal printer, apparatus comprising:
   a supply having (i) a spool and (ii) a carrier having a repeating series of dye frames of different dye colors, said carrier being spirally wound on said spool such that the carrier can be unwound from the spool; and
   electronically-operable memory means mounted on the supply for storing data corresponding to designated dye frames of the carrier, whereby upon connection of the apparatus to a thermal printer, the printer reads the data.

8. Apparatus as set forth in claim 7, wherein the memory means is adapted to store data indicative of corrective action to be taken by a thermal printer to correct the color of a printed image.

9. Apparatus as set forth in claim 8, wherein the memory means is adapted to store color density correcting data.

10. Apparatus as set forth in claim 7, wherein the memory means is adapted to store data representing a location of a defective dye frame of the carrier.

11. Apparatus as set forth in claim 7, wherein the memory means is adapted to store data representing a location of a defective series of dye frames of the carrier.

12. Apparatus as set forth in claim 7, wherein:
   the spool has a hollow end; and
   the memory means is carded by said spool within a recess in the hollow end of the spool.

13. Apparatus as set forth in claim 7 wherein said supply further has a cartridge within which the spool is rotatably mounted.

14. Apparatus comprising:
   a supply having (i) a spool including a longitudinal axis and a hollow end and (ii) a carrier having a repeating series of dye frames of different dye colors, said carrier being spirally wound on said spool such that the carrier can be unwound from the spool; and electronically-operable memory means mounted along the axis of the spool and recessed in the hollow end of the spool for storing data corresponding to designated dye frames of the carrier, whereby upon connection of the apparatus to a thermal printer, the printer reads the data.

15. Apparatus as set forth in claim 14, wherein the memory means is adapted to store data indicative of corrective action to be taken by a thermal printer to correct the color of a printed image.

16. Apparatus as set forth in claim 15, wherein the memory means is adapted to store color density correcting data.

17. Apparatus as set forth in claim 14, wherein the memory means is adapted to store data representing a location of a defective dye frame of the carrier.

18. Apparatus as set forth in claim 14, wherein the memory means is adapted to store data representing a location of a defective series of dye frames of the carrier.

19. Apparatus comprising:

a supply having (i) a spool including a surface defining a hollow interior and (ii) a carrier having a repeating series of dye frames of different dye colors, said carrier being spirally wound on said spool such that the carrier can be unwound from the spool; and electronically-operable memory means recess mounted in the hollow interior of the spool for storing data corresponding to designated dye frames of the carrier, whereby upon connection of the apparatus to a thermal printer, the printer reads the data.

20. Apparatus as set forth in claim 19, wherein the memory means is adapted to store data indicative of corrective action to be taken by a thermal printer to correct the color of a printed image.

21. Apparatus as set forth in claim 20, wherein the memory means is adapted to store color density correcting data.

22. Apparatus as set forth in claim 19, wherein the memory means is adapted to store data representing a location of a defective dye frame of the carrier.

23. Apparatus as set forth in claim 19, wherein the memory means is adapted to store data representing a location of a defective series of dye frames of the carrier.

* * * * *

UNITED STATES PATENT AND TRADEMARK OFFICE
CERTIFICATE OF CORRECTION

PATENT NO.: 5,455,617
DATED: October 3, 1995
INVENTOR(S): Stanley W. Stephenson, et al It is certified that an error appears in the above-identified patent and that said Letters Patent is hereby corrected as shown below:

Col. 8, claim 12, line 57, "carded" should be --carried--

Signed and Sealed this

Ninth Day of January, 1996

*Attest:*

BRUCE LEHMAN

*Attesting Officer*     Commissioner of Patents and Trademarks